June 25, 1968  W. J. VAILLANCOURT  3,389,631
TOGGLE BOLT WITH TOGGLE SUPPORT MEANS
Filed Oct. 6, 1966
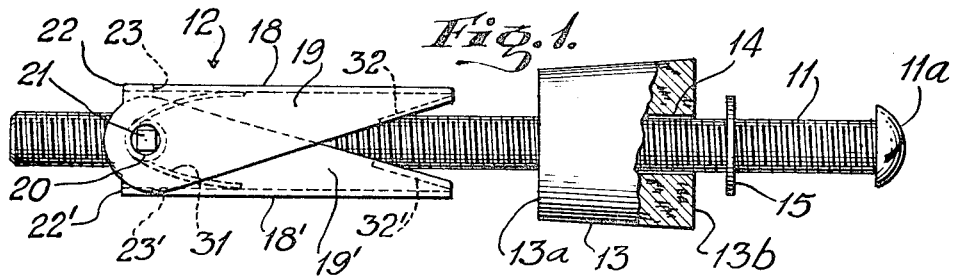
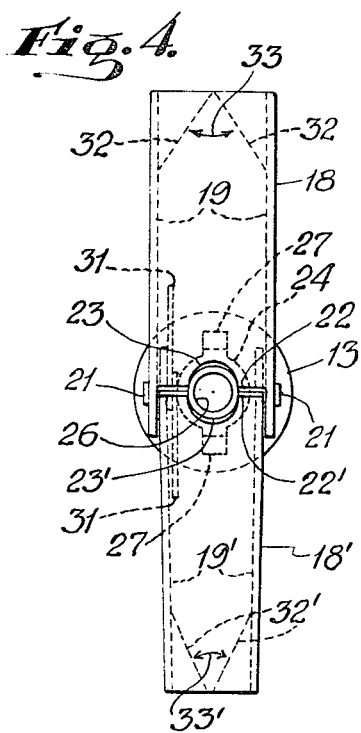
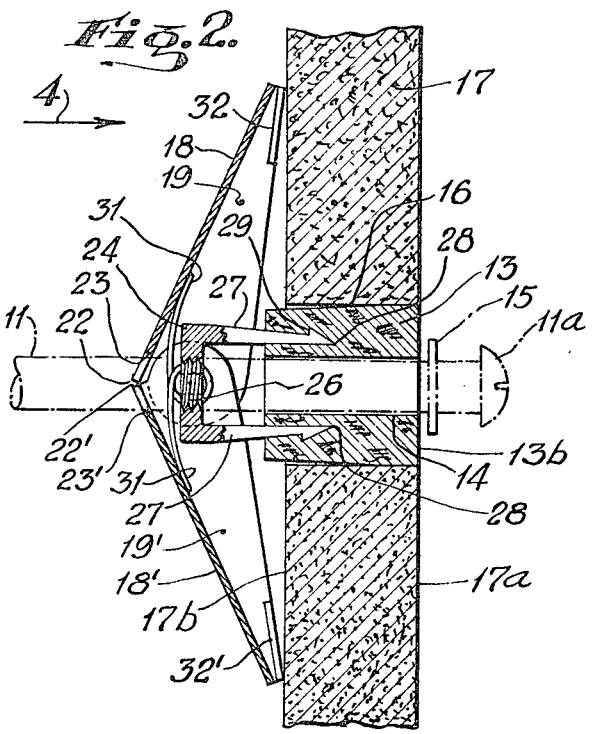
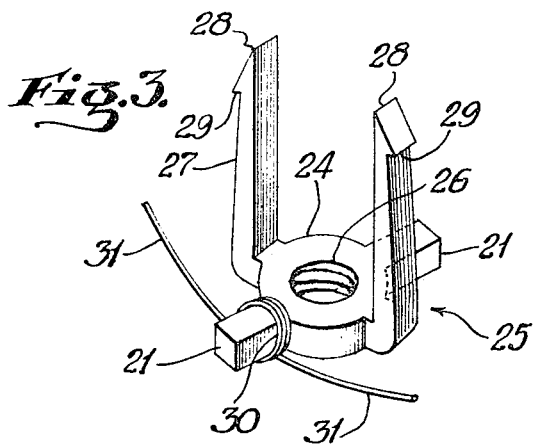
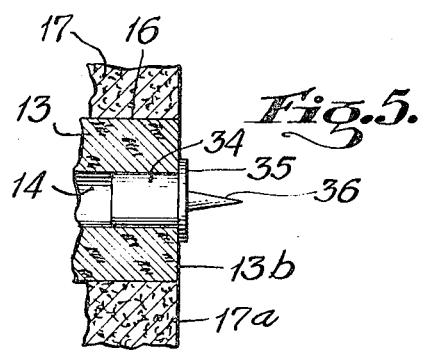
INVENTOR.
WALTER J. VAILLANCOURT
BY
Howard E. Thompson Jr.
ATTORNEY

United States Patent Office 3,389,631
Patented June 25, 1968

3,389,631
TOGGLE BOLT WITH TOGGLE SUPPORT MEANS
Walter J. Vaillancourt, 15 Grant Ave.,
White Plains, N.Y. 10603
Filed Oct. 6, 1966, Ser. No. 584,724
8 Claims. (Cl. 85—3)

ABSTRACT OF THE DISCLOSURE

In a toggle bolt assemblage having toggle means pivotally movable from a position of collapsed orientation in alignment with a bolt to an operative position substantially perpendicularly thereof, the improvement that comprises a unitary hinge-pin, nut and hook element having threaded engagement with said bolt and a tapered plug of yieldable material having an axial passage slideably engaging the bolt between said element and the bolt head, and hook portions of said element being oriented to penetrate and interlock with the yieldable material of said plug when said toggle means is in said operative position. The tapered plug is of a size to firmly engage the hole drilled in a partition means to receive the collapsed toggle means of the toggle bolt assemblage.

A detail of the construction which is also applicable to toggle bolt assemblages generally in which the toggle means are of channeled structure with channel edges operatively engaging partition means, is the provision of lateral offsets extending from said channel edges to provide bearing surfaces limiting penetration into the partition means.

---

Toggle bolts of various types have long been used for anchoring articles to walls, panels and other structures, generally referred to herein as partition means. Such toggle bolts frequently include one or more toggle members movable from a position of substantial alignment with a bolt permitting free passage through the restricted aperture to an extended position, essentially perpendicularly to the bolt and protruding beyond the boundaries of such partition aperture to bear against inner surfaces of the partition means. Probably the most extensively used type of toggle bolts are those employing spring actuated wing toggle members pivoted to a nut having threaded engagement with a bolt.

With these and other type toggle bolts the initial insertion and orientation with respect to a partition means in mounting an article thereon presents no problem. When it is desired to remove the bolt, however, it is difficult or impossible to reorient the toggle means to pass through the restricted partition aperture; and if the bolt is wholly withdrawn from the toggle means it is free to shift position or drop by force of gravity so that reengagement with the bolt is impossible. There is definite disadvantage to the use of said toggle bolts, therefore, in instances in which articles are intended to be repeatedly attached to and removed from a partition means.

Another problem in the use of conventional toggle bolts is that when a plurality of toggle bolts are needed to support a long and heavy article, it may be difficult to properly place the toggle bolts by first drilling through the article to be supported, since the toggle bolts must necessarily pass through portions of a partition means which are not backed by studs or other structural members. It has also been difficult heretofore to first position the toggle bolts with respect to a partition means and then drill holes in the article to be supported in proper alignment with the prepositioned toggle bolts.

The new toggle bolt of the present invention overcomes these problems by providing a tapered plug having a central aperture, closely, but slideably engaging the bolt member of a toggle bolt assemblage, and having an outer diameter to firmly engage a hole drilled in partition means for receiving the particular size toggle bolt assemblage. Cooperating with such plug, the new assemblage includes as integral extensions of the combination pivot and nut member, a plurality of hook members extending substantially parallel to the bolt and having pointed and barbed ends adapted to penetrate and interlock with the material of said plug. The tapered plug can be fashioned from various yieldable materials such as cork, rubber or various plastics including foamed plastic such as styrofoam and the like.

When mounting the new assemblage on a partition means, the tapered plug can be driven into the partition aperture to be substantially flush with the outer surface of the partition and the hook members then drawn into the plug as the bolt action pulls the wing toggles into bearing engagement with the inner partition surface. In order to prevent damage to light-weight plywood and similar partition means or to sheet rock or other relatively soft or fragile partitions means in such pressure mounting of the assemblage, and in the subsequent support of articles on the partition means, the wing toggles of the present invention are provided at the free ends thereof with bearing surfaces which afford a substantial area of bearing engagement with the partition means. These bearing surfaces are fashioned in a manner to receive the bolt member when the wing toggles are flexed into engagement therewith with their outer surfaces substantially parallel, i.e., so that the free ends of the toggle wings present no greater dimension for passage through a partition aperture than the hinged ends thereof.

Novel features of the present invention will be more readily understood from a consideration of the following description taken together with the accompanying drawing in which a preferred adaptation of the invention has been illustrated with the various parts thereof identified by suitable reference characters in each of the views, and in which:

FIG. 1 is a side view of a toggle bolt assemblage in accordance with the invention with the toggle wings shown in a collapsed position.

FIG. 2 is a sectional view through a partition showing the toggle bolt assemblage in mounted association therewith.

FIG. 3 is a perspective view of the combined hinge-pin, nut and hook element of the toggle bolt assemblage with the spring tensioning means arranged thereon.

FIG. 4 has a view of the wing toggles taken in the direction of the arrows 4—4 in FIG. 2, and FIG. 5 is a fragmentary view of the partition means and plug assemblage as shown in FIG. 2 with the bolt removed and center marking means substituted therefor.

As shown in the drawing a preferred adaptation of the present invention comprises an elongated threaded bolt member 11 having a head 11a, which may be slotted as indicated or otherwise fashioned to permit mechanical engagement for rotation of the bolt, and a wing toggle assemblage 12, movable longitudinally of the bolt by threaded engagement therewith. Between the wing toggle assemblage 12, and the bolt head 11a, is a tapered plug 13, having a central cylindrical passage 14, closely, but slideably engaging the bolt 11, and a washer 15 having the external diameter smaller than the diameter of the plug 13, but greater than the diameter of the passage 14 therein. The tapered plug 13 may be fashioned from various yieldable materials such as cork, rubber or various plastics including foamed plastics, such as styrofoam or the like; and the degree of taper is such that the diameter at the end 13a, is slightly less than, and the diameter at the end 13b is slightly greater than, the diameter of a hole 16 drilled through a partition means 17 to receive the toggle bolt assemblage, whereby the plug 13, can be wedged into engagement with the hole 16, disposing the outer end 13b in substantial alignment with the outer surface 17a of a partition means, as indicated in FIG. 2 of the drawing.

The wing toggle assemblage 12, comprises interfitting channel members 18, 18', having side walls 19, 19', of generally triangular contour with apertures 20 in the larger ends thereof for receiving a hinge-pin 21. As shown in the drawing the width of the channel member 18' is sufficiently smaller than the width of the channel member 18 to permit the channel member 18' to fit within the channel member 18 as they engage the hinge-pin 21. The outer surface of the channel member 18, 18' are equally spaced from the hinge-pin 21, and terminate in bearing edges 22, 22' which limit the extent of pivotal movement around the hinge-pin 21, as indicated in FIGS. 2 and 4 of the drawing. The bearing members 22, 22' also have essentially semi-circular cutouts 23, 23' to permit free passage of the bolt 11 therethrough.

The hinge-pin 21, comprises integral extensions of the nut portion 24 of a unitary hinge-pin, nut and hook element 25; the hinge-pin 21, being disposed perpendicularly to the axis of the threaded aperture 26, in said nut portion.

Also, integrally connected to said nut portion 24, are hook members number 27, spaced diametrically with respect to the aperture 26, and extending in direction parallel to the axis thereof in a plane perpendicular to the axis of said hinge-pin extensions. The hooks 27, have pointed ends 28, and closely spaced undercuts 29, to permit free penetration of and interlocking with the yieldable material of the plug 13, as indicated in FIG. 2 of the drawing.

The wing toggle assemblage is spring actuated to permit collapsing to the position shown in FIG. 1 for inserting through the drilled aperture 16 in a partition means, but assuming when released the spread position shown in FIG. 2. While various types of springs can be used to provide this action, a practical type has been illustrated comprising a wire coil spring 30, looped to engage a hinge-pin 21, and having extending ends 31 for tensioned engagement with inner surfaces of the channel member 18, 18'.

It will be apparent that toggle bolt assemblages of the type described will be made in different standard sizes and for each size an appropriate size aperture 16, will be drilled in the partition means to just permit the wing toggle assemblage, collapsed as shown in FIG. 1, to pass therethrough. After the wing toggle assemblage has been passed completely through in aperture 16, and assumed the extended position shown in FIG. 2, the plug 13 is inserted in the aperture and forced into the aperture to the extent desired, suitably to align outer end 13b with the outer surface 17a of the partition means, either by external force or pressure, or by rotating the bolt 11 to advance the wing toggle assemblage 12 in the direction of the bolthead 11a. In thus advancing the wing toggle assemblage 12, the hook members 27 penetrate and become interlocked with the yieldable material of the plug 13, and the free ends of the channel members 18 firmly engage the inner surface 17b of the partition means. In order to provide a definite stop in this engagement between the wing ends and the inner surface 17b of the partition means, and to prevent undue penetration into the material of the partition means, the channel member 18, 18' are provided with bearing surfaces 32, 32' in the form of offset triangular extensions of the side walls 19, 19' thereof. The bearing surfaces 32, 32' extend to substantially the mid point of the channel member 18, 18' and for slightly greater distance along the sides 19, 19', forming a divergent angle 33, 33' therebetween, providing maximum clearance for the bolt 11 when the toggle wings are in the collapsed position as shown in FIG. 1. In this connection, it should be understood that the shape of the bearing surface 32, 32' can be somewhat varied provided such variation does not prevent the channel members 18, 18' from assuming parallel position shown in FIG. 1. In other words, the maximum cross-sectional dimension of the collapsed wing toggle assemblage 12, should be the dimension at a point in alignment with the hinge-pin 21.

In FIG. 2 of the drawing the bolt 11, has been shown in dotted lines to indicate that the bolt can be freely removed and reinserted, with the toggle assemblage 12, firmly supported on the partition means through its engagement with the plug 13. It is possible therefore, to mount the toggle assemblage, or a plurality thereof, on a partition means 17, in advance of final positioning of an article to be supported by the partition means. In such event a practical way of accurately positioning the location of holes in an article to be supported is to insert in the passage 14 of the plug 13 a center marking device, as indicated in FIG. 5. The center marking device may comprise a shank 34 extending into the passage 14, a collar 35 to limit such penetration, and a pointed extension 36, which can either mark or penetrate an article to be supported for accurate location of the hole or holes to be drilled therein. Such center marking devices are well known in the art, and the foregoing description of the use of such devices is intended merely to further illustrate the practical utility of the new toggle bolt assemblage.

In instances where the new type toggle bolt assemblages have been in use and are no longer needed at a particular location, the partition surface can be prepared for refinishing by merely tightening the bolt head 11a, against the washer 15, as shown in FIG. 2 of the drawing, sufficiently to force the outer end 13b of the plug further into the passage 16, to be somewhat inwardly spaced with respect to the outer surface 17a of the partition means. Then upon removal of the bolt 11, and the washer 15, the slight recess in the outer surface 17a of the partition means can readily be filled with patching plaster or the like to prepare the surface for refinishing. Such sealing off of the mounted assemblage does not prevent its future use, however, and by chipping away the plaster to again expose the plug 13, the mounted toggle bolt assemblage can be put to further use if desired.

The basic novelty of the present invention is considered to reside in the unitary hinge-pin, nut and hook element, having threaded engagement with a bolt, and its cooperative interlocking action with a tapered plug of yieldable material slideably engaging said bolt. While the invention has been particularly described with respect to a toggle bolt assemblage employing wing type toggles, it will be apparent that the basic principles of the invention can be applied to any toggle bolt assemblage in which the toggle means is pivotly coupled with the unitary hinge-pin, nut and hook element.

It should also be understood that while the bearing surfaces 32, 32' provide a special advantage in the new toggle bolt assembly, the provision of bearing surfaces on the partition engaging portions of the toggle means is advantageous in toggle bolts generally to prevent undesired penetration of the toggle means into the material of a partition. In the broad sense, therefore, the improvement as it pertains to said beaming surfaces can be expressed in the following terms. In a toggle bolt assemblage having toggle means pivotally movable from a position of collapsed orientation in alignment with a bolt to an operative position substantially perpendicularly thereof, said toggle means being of channeled contour normally providing bearing contact between channel edges and an associated partition means, the improvement that comprises offset extensions of said channel edges providing beaming surfaces for engagement with said partition means, said offset extensions being so located and proportioned as to permit collapsed orientation of said toggle means with the maximum cross-sectional dimension of said collapsed assemblage being at the pivot point of said toggle means.

Various changes and modifications in the improved toggle bolt assemblage herein described will occur to those skilled in the art, and to the extent that such changes and modifications are embraced by the appended claims, it is to be understood that they constitute part of the present invention.

I claim:
1. In a toggle bolt assemblage having toggle means pivotally movable from a position of collapsed orientation in alignment with a bolt to an operative position substantially perpendicularly thereof, the improvement that comprises a unitary hinge-pin, nut and hook element having threaded engagement with said bolt and a tapered plug of yieldable material having an axial passage slideably engaging the bolt between said element and the bolt head, and hook portions of said element being oriented to penetrate and interlock with the yieldable material of said plug when said toggle means is in said operative position.

2. An improved toggle bolt assemblage as defined in claim 1, wherein said unitary element has hinge-pin extensions providing a pivot axis for the toggle means disposed perpendicularly to the axis of the threaded nut portion of said element, a plurality of hook members projecting from said nut portion at diametrically opposed positions thereon and in a plane parallel to the axis of said nut portion and perpendicular to the axis of said hinge-pin extensions, and said tapered plug having a small diameter slightly less than, and a large diameter slightly greater than, the diameter of the hole in a partition means for receiving the toggle means in the collapsed orientation thereof.

3. An improved toggle bolt assemblage as defined in claim 2, wherein said hook members have sharpened points, and barb-forming undercuts closely spaced from said points facilitating penetration of and interlocking with the yieldable material of said plug.

4. An improved toggle bolt assemblage as defined in claim 2, wherein the material of said plug is sufficiently yieldable to permit said plug to be drawn into the hole in said partition so that the outer end of said plug is substantially flush with the outer surface of said partition.

5. An improved toggle bolt assemblage as defined in claim 2, wherein said toggle means comprises interfitting wing toggle members, one end of each member being pivotally mounted on the hinge-pin extensions of said unitary element, and the opposed, movable ends of said members having inwardly extending offsets of the side edges thereof providing bearing surfaces for contact with a partition.

6. An improved toggle bolt assemblage as defined in claim 5, wherein said inwardly extending offsets are of essentially triangular contour and extend along ends of said toggle members to approximately the mid point thereof, and a slightly greater distance along adjacent sides thereof, and the divergent angle of the inner opposed edges of said offsets providing clearance for said bolt in the collapsed position of said wing toggle members.

7. In a toggle bolt assemblage having toggle means pivotally movable from a position of collapsed orientation in alignment with a bolt to an operative position substantially perpendicularly thereof, said toggle means being of channeled contour normally providing bearing engagement between channel edges and an associated partition means, the improvement that comprises offset extensions of said channel edges providing bearing surfaces for engagement with said partition means, said offset extensions being so located and proportioned as to permit collapsed orientation of said toggle means with the maximum cross-sectional dimension of said collapsed assemblage being at the pivot point of said toggle means.

8. An improved toggle bolt assemblage as defined in claim 7, wherein said toggle means comprises interfitting wing toggle members each having a pivot mounting end and a movable partition engaging end, and the bearing surface of said toggle members being of substantially triangular contour and extending to approximately the mid point of each movable end and a slightly greater distance along adjacent side edges of said members.

References Cited
UNITED STATES PATENTS

| 1,600,035 | 9/1926 | Brenizer | 85—3 |
| 1,623,789 | 4/1927 | Hubener | 85—3 |
| 1,694,493 | 12/1928 | Tomkinson | 85—3 |
| 2,024,871 | 12/1935 | Parsons | 85—3 |
| 2,616,327 | 11/1952 | Karitzky | 85—3 |
| 3,211,042 | 10/1965 | Fischer | 85—3 |

FOREIGN PATENTS 544,088  3/1942  Great Britain.

MARION PARSONS, Jr., *Primary Examiner.*